(12) United States Patent
Miller

(10) Patent No.: US 9,678,331 B1
(45) Date of Patent: Jun. 13, 2017

(54) OPTICAL PATH SWITCHING DEVICE

(71) Applicant: RAYTHEON COMPANY, Waltham, MA (US)

(72) Inventor: Kirk A. Miller, Dallas, TX (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 15/009,292

(22) Filed: Jan. 28, 2016

(51) Int. Cl.
*G02B 26/08* (2006.01)
*H04N 5/225* (2006.01)

(52) U.S. Cl.
CPC ....... *G02B 26/0816* (2013.01); *H04N 5/2254* (2013.01)

(58) Field of Classification Search
CPC ........ G02B 2006/12145; G02B 6/3514; G02B 26/08; G02B 26/0816; G02B 7/04; G02B 7/198; H04N 5/2254; H04N 5/2255; H04N 5/2259; H04N 5/2256; H04N 5/2257; H04N 5/2258
USPC ...................................................... 359/221.2
See application file for complete search history.

(56) References Cited

U.S. PATENT DOCUMENTS 9,176,312 B2 * 11/2015 Redford ............ G02B 26/0816
2012/0140219 A1    6/2012 Cleary
2013/0021214 A1 *  1/2013 Zimmerman ............ H01Q 3/08
                                                                    359/873

FOREIGN PATENT DOCUMENTS

EP         0390641 A1    10/1990

OTHER PUBLICATIONS

International Search Report and Written Opinion for application No. PCT/US2016/059086 dated Feb. 9, 2017.

* cited by examiner

*Primary Examiner* — Euncha Cherry
(74) *Attorney, Agent, or Firm* — Lando & Anastasi, LLP (57) ABSTRACT

An optical path switching device is configured to selectively direct electromagnetic radiation toward one detector of a plurality of detectors. The switching device includes a platform, a mirror mount rotatably mounted on the platform by a bearing, a mirror coupled to the mirror mount, and an active actuator configured to rotate the mirror mount with respect to the platform a predetermined amount to direct electromagnetic radiation toward a desired detector.

16 Claims, 7 Drawing Sheets

OPTICAL PATH SWITCHING DEVICE

FEDERALLY SPONSORED RESEARCH

This invention was made with government support under Grant No. [withheld] awarded by [federal agency withheld]. The U.S. government has certain rights in this invention.

BACKGROUND

Modern tactical aircraft use a number of imaging aids to assist the crew in viewing a scene, selecting targets in the scene, and directing weapons against the selected targets. Visible, infrared, and/or specific spectral bands imaging devices are used in various applications to form an image of the scene. The type imaging spectrum depends upon the mission, weather conditions, the nature of the scene, as well as other factors.

The field of view of an imaging device, used to form the image of the scene, describes the range of the captured scene. A wide field of view allows the imaging device to capture a large area of the scene. In turn, a smaller field of view captures less of the scene, allowing the image device to "focus in" on the image, and may further help to discern small features within the image.

Multi-spectral targeting systems may use both infrared and visible light imaging sensors and may include multiple different optical systems suited for use with each type of sensor. For example, an optical system used with an infrared image sensor may not be suitable for use with a visible light image sensor. Additional optical systems may be included in the multi-spectral targeting systems for capturing images with different fields of view. In certain prior embodiments, three cameras using a single aperture one at a time, and two discrete mirrors with two actuators may be employed. In other known embodiments, two cameras using a single aperture one at a time, one discrete mirror with one actuator may be employed. Other embodiments may include the use of discrete mirrors, one for each of four cameras with four actuators to share a single aperture, or the use of beam splitter for two cameras to simultaneously share a single aperture.

SUMMARY OF INVENTION

One aspect of the present disclosure is directed to an optical path switching device configured to selectively direct electromagnetic radiation toward one detector of a plurality of detectors. In one embodiment, the switching device comprises a platform, a mirror mount rotatably mounted on the platform by a bearing, a mirror coupled to the mirror mount, and an active actuator configured to rotate the mirror mount with respect to the platform a predetermined amount to direct electromagnetic radiation toward a desired detector.

Embodiments of the switching device may include rotatably coupling the mirror mount to the platform by a bearing. The active actuator may include a spur drive gear, a motor configured to drive the spur drive gear, and a spur driven gear coupled to the bearing of the mirror mount and configured to be driven by the spur drive gear. The active actuator further may use several adjustable mechanical stops to precisely position the mirror mount and the mirror in predetermined positions. The active actuator may be configured to rotate the mirror mount and the mirror to direct the reflected electromagnetic radiation to one of five detectors. The five detectors may include a visible (VIS) camera, a near infrared (NIR) camera, a short-wave infrared (SWIR) camera, a first test camera, and a second test camera. A controller may be coupled to the active actuator, the controller being configured to manipulate the accelerations, velocities, position and holding torques during the rotation of the mirror mount and the mirror to direct the reflected electromagnetic radiation to a desired detector. The switching device further may use a spring as a passive actuator configured to hold an angle of the mirror with respect to the mirror mount. The passive actuator may include a bracket secured to the mirror base, the bracket having a rack gear portion. The rack gear portion may be configured to engage a pinion gear provided on a mirror shaft of the mirror, with the rack gear portion serving as a cam follower and the pinion gear serving as a mirror driver. The passive actuator may maintain the mirror preloaded against an adjustable stop.

Another aspect of the disclosure is directed to a method of directing electromagnetic radiation from a mirror to a detector of a plurality of detectors. In one embodiment, the method comprises: directing electromagnetic radiation to a mirror supported by a mirror mount coupled to a platform; and rotating the mirror to change a direction of electromagnetic radiation directed by the mirror to direct electromagnetic radiation toward a desired detector.

Embodiments of the method further may include configuring an active actuator to rotate the mirror mount with respect to the platform a predetermined amount to direct electromagnetic radiation toward the desired detector. The active actuator may include a spur drive gear, a motor configured to drive the spur drive gear, and a spur driven gear coupled to the bearing of the mirror mount and configured to be driven by the spur drive gear. The method further may comprise stopping the rotation of the mirror by one stop of several adjustable stops each configured to position the mirror mount and the mirror in a predetermined position. The active actuator may be configured to rotate the mirror mount and the mirror to direct the reflected electromagnetic radiation to one of five detectors. The method further may comprise adjusting an angle of the mirror with respect to the mirror mount. A passive actuator may be configured to adjust an angle of the mirror with respect to the mirror mount. The passive actuator may include a bracket secured to the mirror base, the bracket having a rack gear portion. The rack gear portion may be configured to engage a pinion gear provided on a mirror shaft of the mirror, with the rack gear portion serving as a cam follower and the pinion gear serving as a mirror driver.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

As discussed above, there is a need to enable several detectors to share a common aperture by up to five detectors, one at a time. The optical path switching device of embodiments of the present disclosure enable one of several optical detectors from a selection of up to five detectors. Aspects and embodiments are directed to an optical path switching device having a single mirror for a single aperture that can be rotated to one of up to four detectors. The mirror can be removed from the optical path for the fifth detector. The optical path switching device enables one detector of five detectors to have continuous use of a common aperture.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
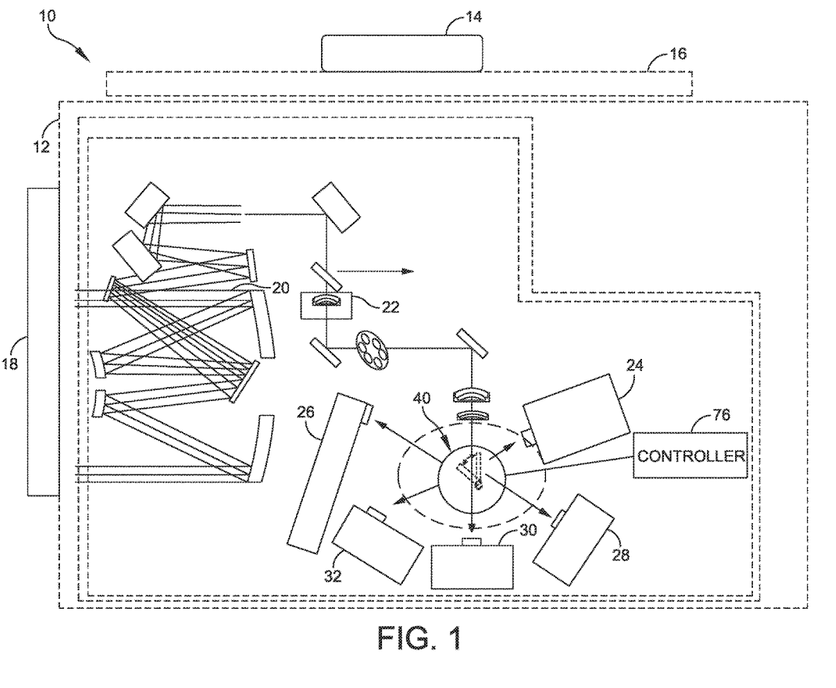
FIG. 1 is a schematic block diagram of an optical path switching device of an embodiment of the present disclosure.

Referring to FIG. 1, an optical system is generally indicated at 10. As shown, the optical system 10 includes an elevation platform 12 that is coupled to an azimuth base 14 by rotary joints to an azimuth yoke 16. The elevation platform 12 includes fine elevation and cross-elevation gimbals, which are configured to support components of the optical system 10, including, but not limited to a window 18, a shared aperture telescope 20, common imager optics 22 and multiple detectors. In one embodiment, the detectors include a visible (VIS) camera 24 ("camera #1"), a near infrared (NIR) camera 26 ("camera #2"), a first test camera 28 ("camera #3"), a short-wave infrared (SWIR) camera 30 ("camera #4"), and a second test camera 32 ("camera #5"). It should be noted that any number of detectors can be provided, and that the types of detectors may be varied to conform to the particular application of the optical system 10.

Electromagnetic radiation (e.g., reflected solar illumination) is directed from the common imager optics 22 to the detectors by way of an optical path switching device, which is generally indicated at 40 in FIG. 1. The switching device 40 is configured to direct electromagnetic radiation from the common imager optics 22 to the SWIR camera 30 and optionally to one of the other detectors, specifically, the VIS camera 24, the NIR camera 26, the first test camera 28, and the second test camera 32. The five detectors share a single, common imager optics 22, with four of the detectors (24, 26, 28, 32) requiring a reflective fold and the fifth detector (30) using un-deviated light. Although the switching device 40 in the shown embodiments to be configured to direct electromagnetic radiation to one of the five shown detectors, it should be understood that the switching device can be configured to accommodate a lesser number of detectors, if fewer than five detectors are provided. Also, the switching device 40 can be configured to vary the directions the switching device directs electromagnetic radiation based on the positions of detectors with respect to the switching device and the common imager optics 22.

Figure 2:
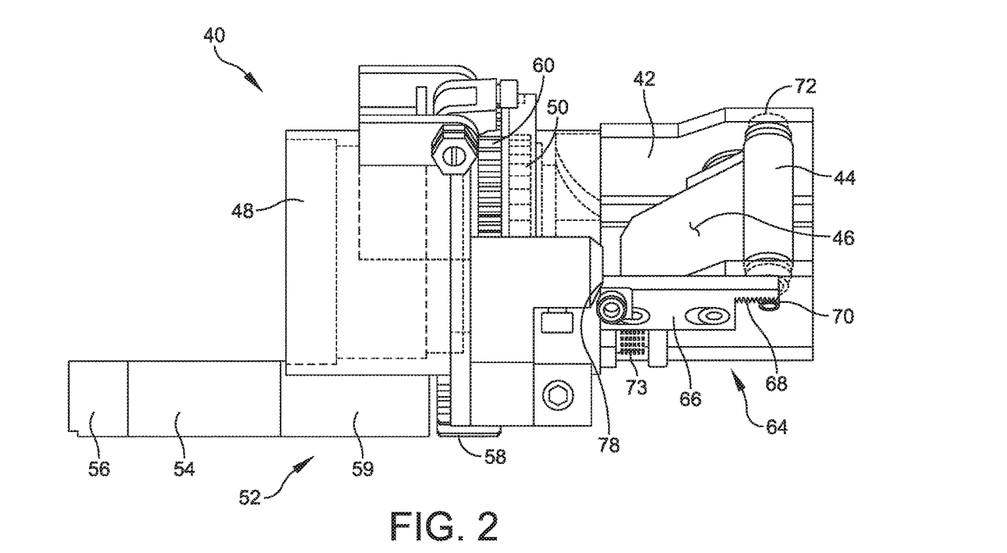
FIG. 2 is a side view of the optical path switching device.
Figure 3:
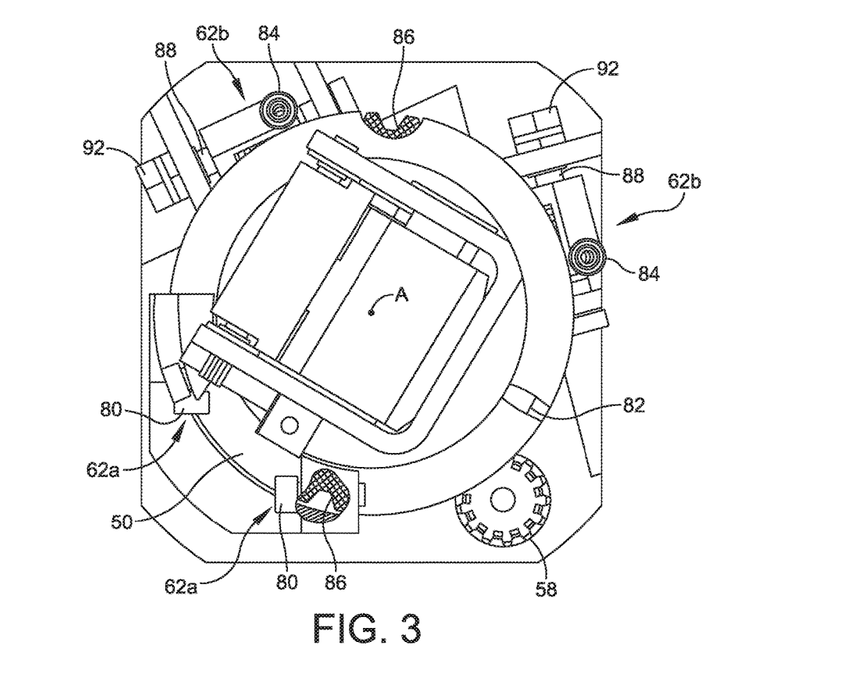
FIG. 3 is an end view of the optical path switching device.

Referring to FIGS. 2 and 3, the switching device 40 includes several components that are used to direct magnetic radiation through the switching device and toward the detectors (24, 26, 28, 30, 32). Specifically, the switching device 40 includes a mirror mount 42 and a mirror 44 secured to the mirror mount. In one embodiment, the mirror 44 includes a mirror surface 46 that reflects light. In a particular embodiment, the mirror 44 is a flat mirror, constructed of aluminum with a high reflectivity coating optimized for the desired imaging wavelength regions. The mirror mount 42 is rotatably connected to a mirror mount platform 48 by a duplex pair bearing 50. As will be described below, the mirror mount 42 is configured to position the mirror 44 to direct reflected electromagnetic energy toward four of the five detectors (e.g., detectors 24, 26, 28 32), and configured to move the mirror out of the way so that electromagnetic energy is directed from the common aperture to a fifth detector (e.g., detector 30).

The mirror mount 42 is rotated with respect to the mirror mount platform 48 by an actuator, generally indicated at 52, sometimes referred to as an "active actuator." In one embodiment, the active actuator 52 includes a motor 54, an encoder 56, a gearbox 59, and a spur drive gear 58, which are configured to drive the rotation of an associated spur driven gear 60 coupled to the mirror mount 42. The arrangement is such that the active actuator 52 is configured to rotate the mirror mount 42 and the mirror 44 a predetermined amount. Although the active actuator 52 includes spur gears 58, 60, it should be understood that other drive mechanisms may be used to rotate the mirror mount 42 with respect to the mirror mount platform 48. One benefit of spur gears 58, 60 is that the mirror mount 42 can be indexed with respect to the mirror mount platform 48 to achieve a precise movement with controlled hysteresis of the mirror mount and thus the mirror 44.

To ensure that the mirror mount 42 and the mirror 44 are accurately positioned, four adjustable stops, each generally indicated at 62, may be provided adjacent the spur driven gear 60. In one embodiment, the switching device 40 includes four stops 62 that are used to strategically position the mirror mount 42 and the mirror 44. As shown, the active actuator 52 is configured to rotate the mirror mount 42 and the mirror 44 to direct the reflected electromagnetic radiation to one of the five detectors (24, 26, 28, 30, 32). The four adjustable stops 62 of the switching device 40 limit the rotation of the mirror mount 42 and the mirror 44 to a desired detector. In a certain embodiment, the switching device 40 is manipulated, e.g., by a controller, to rotate the mirror mount 42 and the mirror 44 by the active actuator 52 to direct the reflected electromagnetic radiation to a desired detector by powering the motor 54 of the active actuator.

One type of stop 62a includes two adjustable hard stops at the extremes of the mirror mount 42 travel. With this type of stop 62a, the stop uses a precision screw 80 that is ground flat perpendicular to the screw action to contact a cylindrically-shaped surface 82 on the mirror mount 42. The precision screw 80 is clamped after a factory adjustment. The active actuator 52 holds the cylindrical surface 82 against the precision screw 80, using a programmable level of torque commanded by a controller, such as controller 76 described below.

Another type of stop 62b includes two intermediate stops each having a detent roller cam follower 84, which employs a torsion spring-loaded arm to force the cam follower to always remain in contact with the mirror mount platform 48. The stop action occurs when the roller is positioned in a local V-shaped feature 86 on the mirror mount 42. Adjustment of the stop uses a screw thread 88, which moves the torsion spring-loaded arm 90, moving the clocking angle optical position of the mirror mount 42. The screw is clamped in place after the factory adjustment using a locking nut 92. The active actuator 52 is commanded to the middle of its hysteresis band to allow the mirror mount to position accurately using the internally generated forces and torque generated by the detent roller cam follower 84.

To move the mirror 44 with respect to the mirror mount 42, the switching device 40 further includes another actuator, generally indicated at 64, sometimes referred to as a "passive actuator." While the active actuator 52 is capable of rotating the clocking angle of the mirror 44, the passive actuator 64 counteracts against the active actuator moving the mirror 44 out of the way of electromagnetic radiation being directed to the fifth detector (e.g., detector 30). The passive actuator 64 holds the mirror 44 in place a 45° incident angle with respect to an optical input axis A.

In one embodiment, the passive actuator 64 includes a bracket 66 secured to the mirror mount 42. As shown, the bracket 66 includes a rack gear portion 68, which is positioned to engage a pinion gear 70 provided on a mirror shaft 72 of the mirror 44. The pinion gear 70 applies a torque to the mirror 44 and the rack gear portion 68 serves as a cam follower during contact with a limited clocking angle cam profile 78. The bracket 66 is preloaded by a helical coil compression spring 73, which holds the mirror 44 against an adjustable mirror stop 74 for all of the optical positions except when the mirror is directed to the camera 30. The adjustable mirror stop 74 can adjust the angle of the mirror 44 to achieve a 45° angle with the incoming optical axis A.

In a certain embodiment, the bearing 50 can be an angular contact or x-contact bearing supported on mirror mount platform 48 that rotates the clocking angle of the mirror mount 42 about the incoming optical axis A, with four discrete adjustable positions. A fifth position is maintained through an actuator control loop associated with a controller of the optical system 10. As the mirror mount 42 clocking angle rotates to the fifth position, the rack gear portion 68 (functioning as a cam follower) is linearly translated causing rotation of the pinion gear 70 to actuate the mirror 44 by rotating it into an "out" position through a mechanical connection of the rack and pinion pair. The arrangement is such that five of eight angular degrees of freedom are adjustable for the four detectors that use the mirror 44.

Referring back to FIG. 1, a controller 76 is provided to control the operation of the switching device 40 as well as the other components of the optical system 10. In one embodiment, the controller 76 is coupled to the active actuator 52 of the optical switching system 40, with the controller being configured to manipulate the rotation of the mirror mount 42 and the mirror 44 to direct the reflected electromagnetic radiation to a desired detector by powering the motor of the active actuator.

Figure 4:
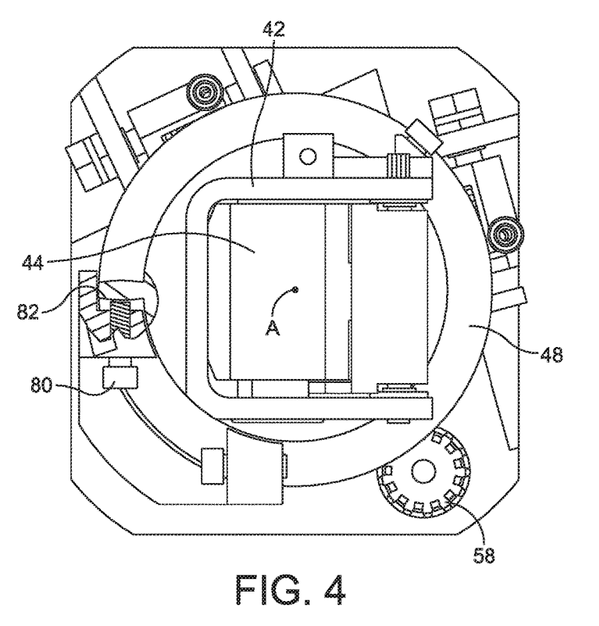
FIG. 4 is an end view of the optical path switching device directed to a first detector.
Figure 5:
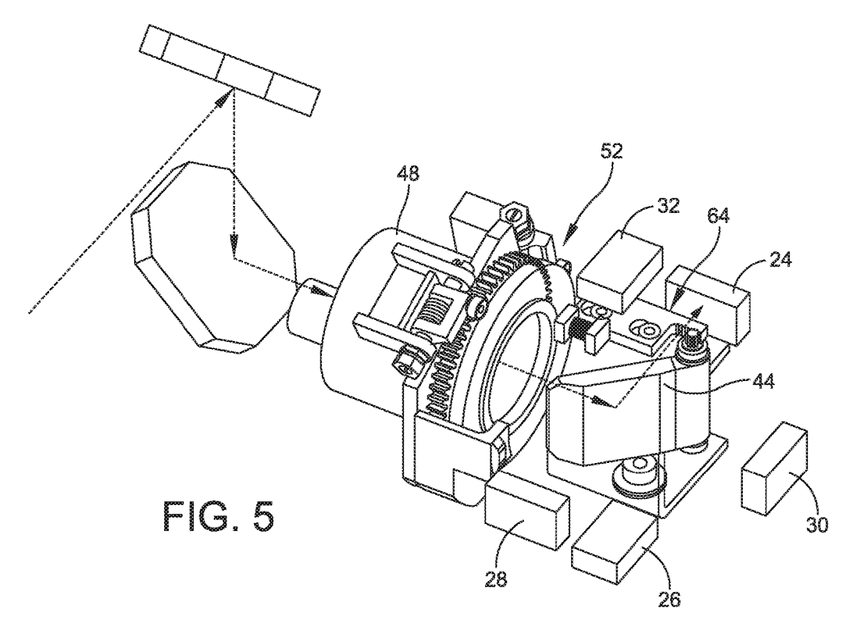
FIG. 5 is a perspective view of the optical path switching device shown in FIG. 4 directed to the first detector.

Referring to FIGS. 4 and 5, the mirror 44 of the mirror mount 42 of the switching device 40 is positioned to direct electromagnetic radiation toward the first camera 24. As shown, the mirror 44 is rotated so that the mirror surface 46 achieves a 45° angle with respect to the optical axis A and is pointed to the first camera 24 via the clocking angle position of the mirror mount 42. The mirror 44 is configured to enable electromagnetic radiation to reflect off the mirror surface 46 to the first camera 24. The active actuator 52 is used to rotate the mirror mount 42 and the mirror 44 to the shown position holding the cylindrically-shaped surface 82 against the precision screw 80.

Figure 6:
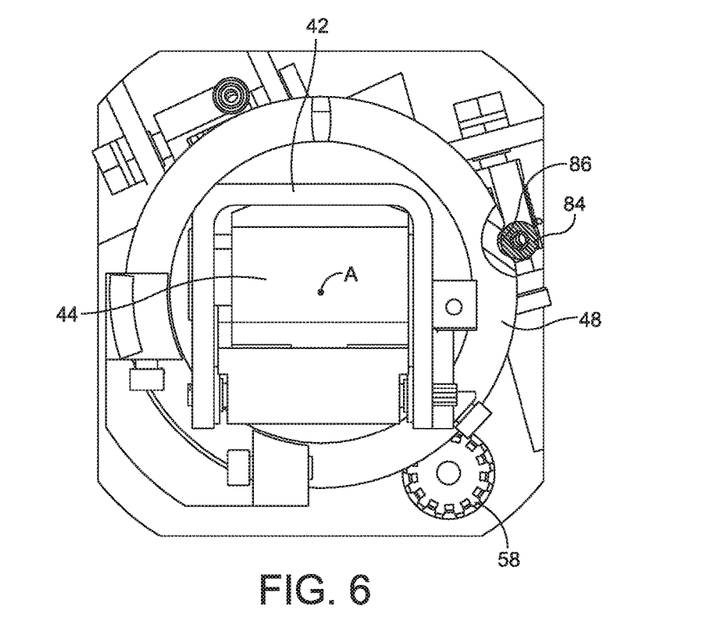
FIG. 6 is an end view of the optical path switching device directed to a second detector.
Figure 7:
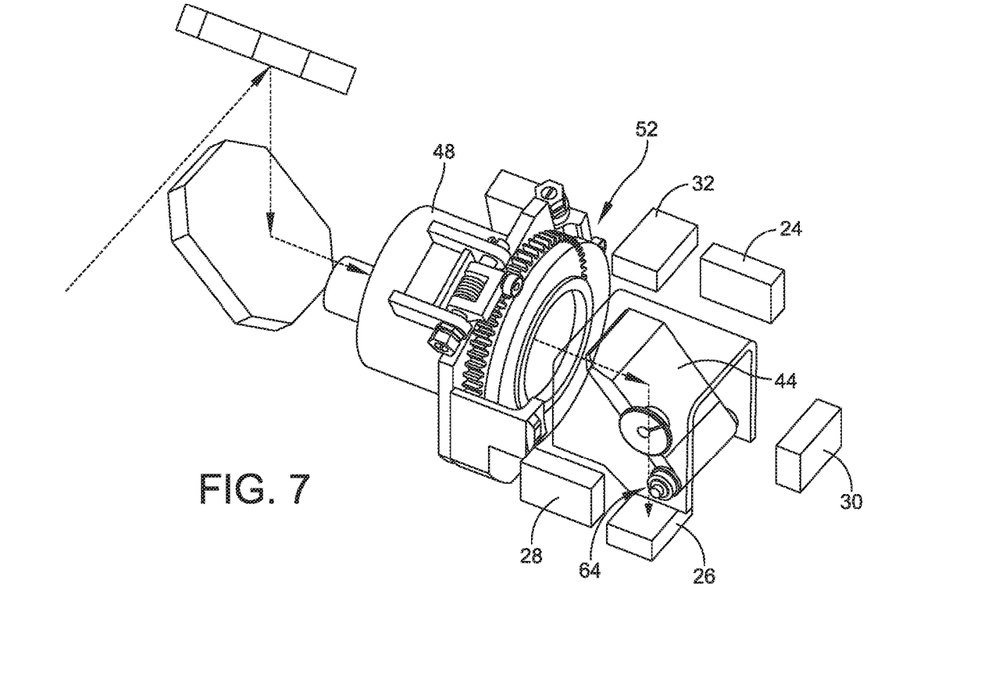
FIG. 7 is a perspective view of the optical path switching device shown in FIG. 6 directed to the second detector.

Referring to FIGS. 6 and 7, the mirror 44 of the mirror mount 42 of the switching device 40 is positioned to direct electromagnetic radiation toward the second camera 26. As shown, the mirror 44 is rotated clockwise 90° via the mirror mount 42 with respect to the position shown in FIGS. 4 and 5. The mirror 44 is configured to enable electromagnetic radiation to reflect off the mirror surface 46 to the second camera 26. The active actuator 52 is used to rotate the mirror mount 42 and the mirror 44 to the shown position, in the middle of the gear hysteresis band (gear backlash) so that the detent roller cam follower 84 is seated in the V-shaped feature 86 thereby precisely locating the mirror mount clocking angle.

Figure 8:
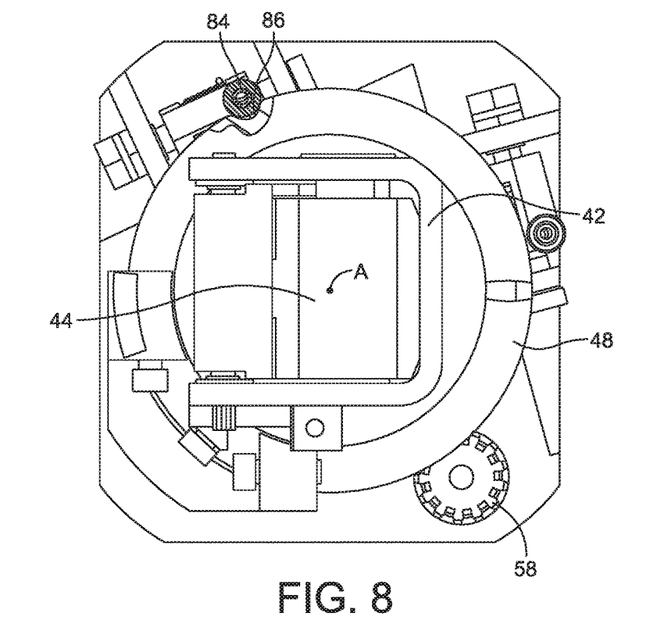
FIG. 8 is an end view of the optical path switching device directed to a third detector.
Figure 9:
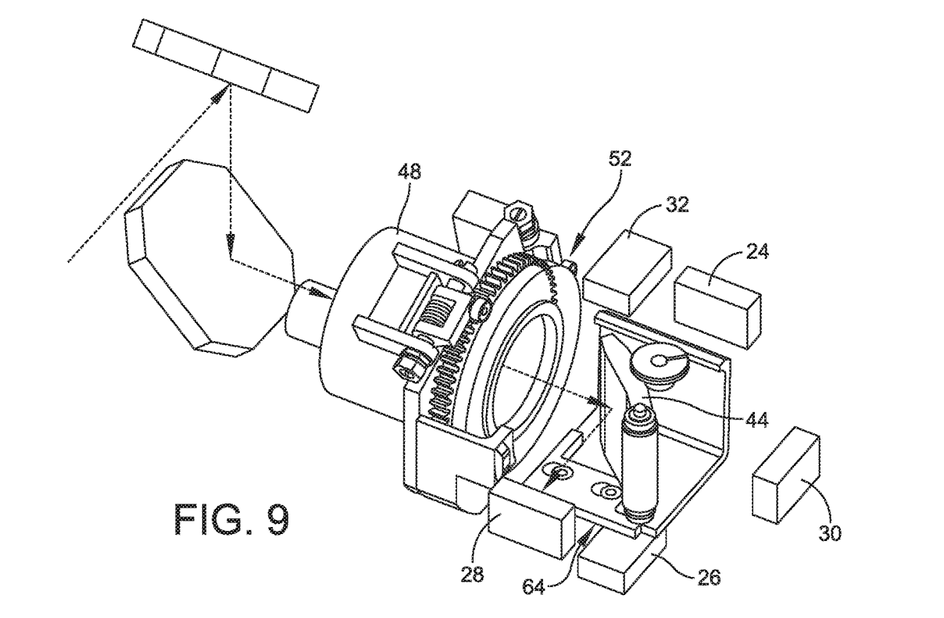
FIG. 9 is a perspective view of the optical path switching device shown in FIG. 8 directed to the third detector.

Referring to FIGS. 8 and 9, the mirror 44 of the mirror mount 42 of the switching device 40 is positioned to direct electromagnetic radiation toward the third camera 28. As shown, the mirror 44 is rotated clockwise another 90° via the mirror mount 42 with respect to the position shown in FIGS. 6 and 7. The mirror 44 is configured to enable electromagnetic radiation to reflect off the mirror surface 46 to the third camera 28. The active actuator 52 is used to rotate the mirror mount 42 and the mirror 44 to the shown position, in the middle of the gear hysteresis band (gear backlash) so that the detent roller cam follower 84 is seated in the V-shaped feature 86 thereby precisely locating the mirror mount clocking angle.

Figure 10:
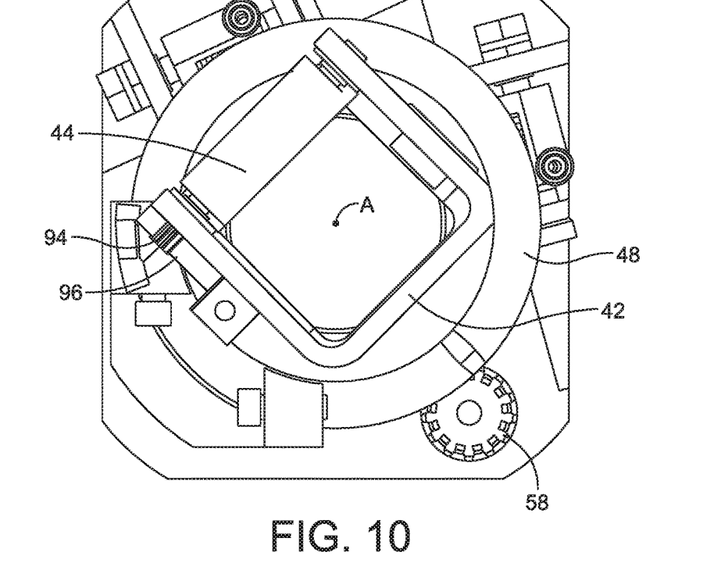
FIG. 10 is an end view of the optical path switching device directed to a fourth detector.
Figure 11:
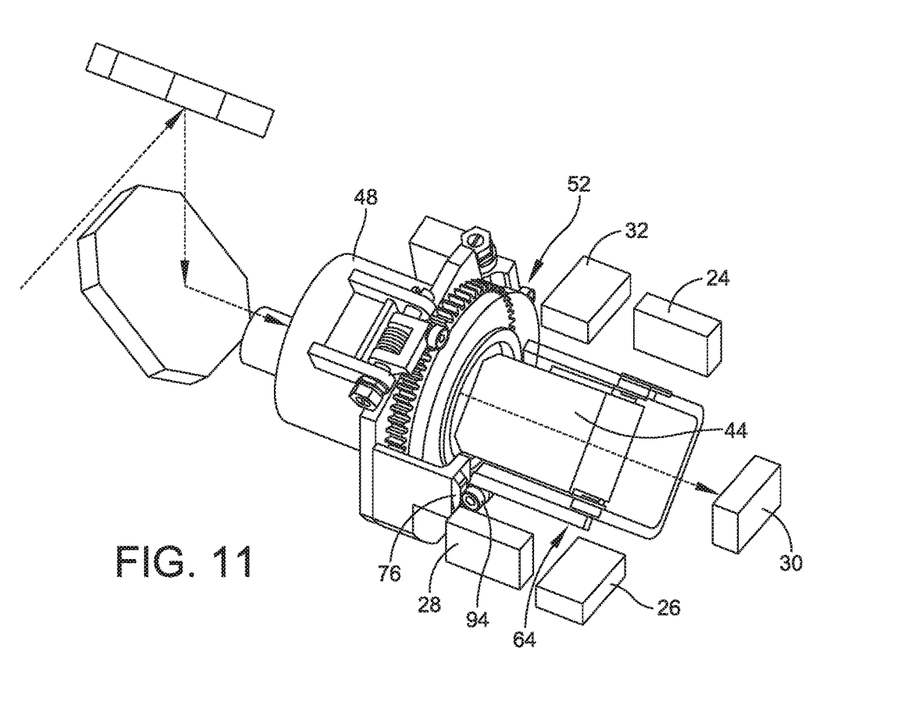
FIG. 11 is a perspective view of the optical path switching device shown in FIG. 10 directed to the fourth detector.

Referring to FIGS. 10 and 11, the mirror 44 of the mirror mount 42 of the switching device 40 is positioned to enable the electromagnetic radiation to be directed toward the fourth camera 30 by moving the mirror out of the way. As shown, the mirror mount 42 is rotated clockwise another 45° with respect to the position shown in FIGS. 8 and 9. The mirror 44 is rotated out of the way by the interaction of the bracket cam follower 94 with the limited clock angle cam profile surface 96. The active actuator 52 is used to rotate the mirror mount 42 and the mirror 44 to the shown position. The holding force of the passive actuator 64 on the mirror 44 is counteracted by the engaging of the limited clock angle cam profile 78.

Figure 12:
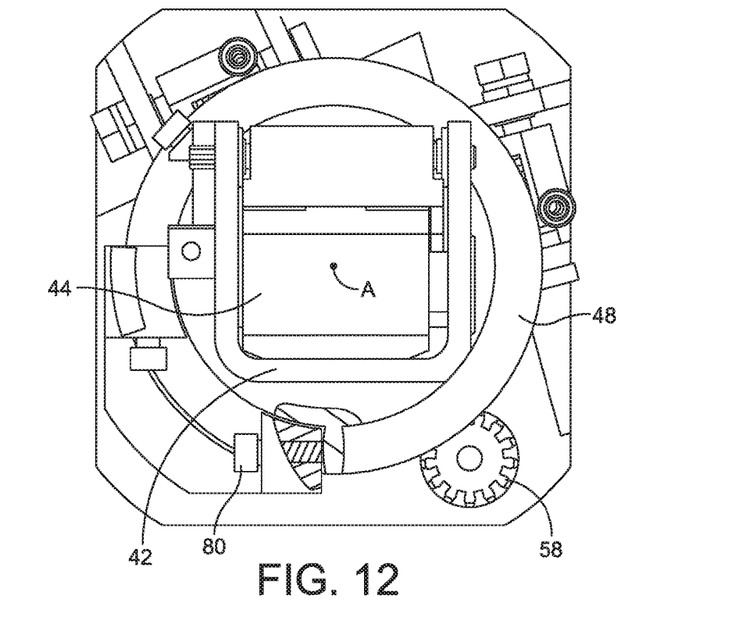
FIG. 12 is an end view of the optical path switching device directed to a fifth detector.
Figure 13:
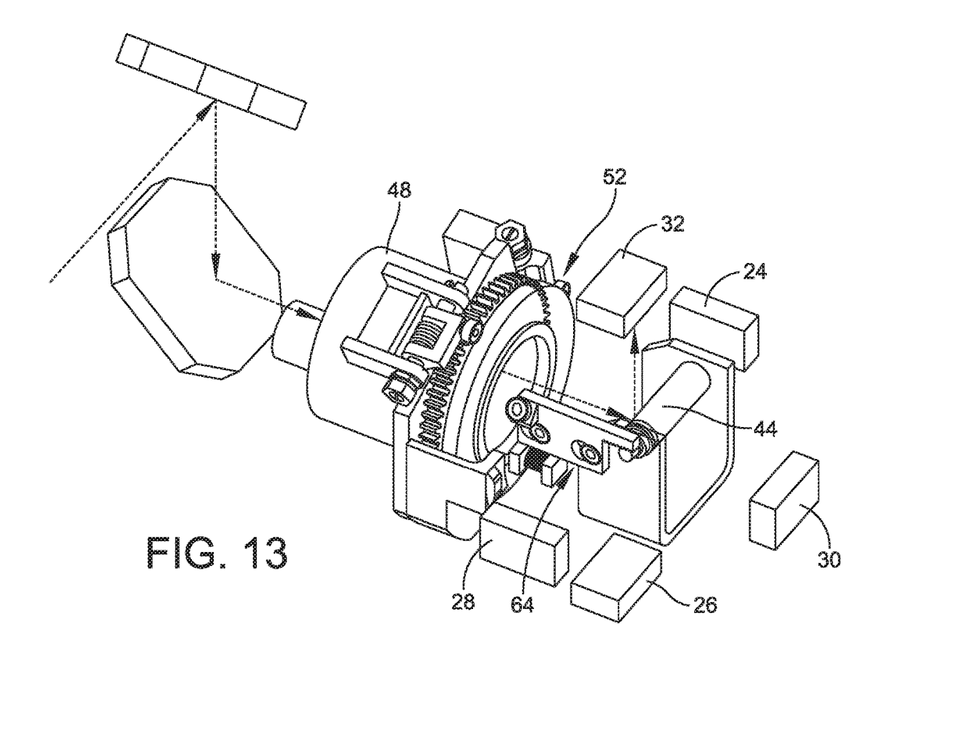
FIG. 13 is a perspective view of the optical path switching device shown in FIG. 12 directed to the fifth detector.

Referring to FIGS. 12 and 13, the mirror 44 of the mirror mount 42 of the switching device 40 is positioned to direct electromagnetic radiation toward the fifth camera 32. As shown, the mirror mount 42 is rotated clockwise another 45° with respect to the position shown in FIGS. 10 and 11. The mirror 44 returns to its contact with the adjustable mirror stop 74 so that the mirror surface 46 achieves a 45° angle with respect to the optical axis A and clocked towards the fifth camera 32. The mirror 44 is configured to enable electromagnetic radiation to reflect off the mirror surface 46 to the fifth camera 32. The active actuator 52 is used to rotate the mirror mount 42 and the mirror 44 to the shown position and holds the cylindrically-shaped surface 82 against the precision screw 80. The bracket cam follower 94 disengages the limited clock angle cam profile 78, with the passive actuator 64 returning the mirror 44 to contact with the adjustable stop 74.

It should be observed that the optical system 10 embodies a single actuator that is used to move a single mirror, thereby reducing the size of the total assembly. It should further be observed that the switching device of embodiments of the present disclosure enables selection of one detector that may be switched with up to four other options for a total of five detector combinations using a common imager optics 22. Further, the switching device enables easier detector upgrades as the detectors are more physically separated allowing modular construction options.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical path switching device configured to selectively direct electromagnetic radiation toward one detector of a plurality of detectors, the switching device comprising:
   a platform;
   a mirror mount rotatably mounted on the platform by a bearing;
   a mirror coupled to the mirror mount; and
   an active actuator configured to rotate the mirror mount with respect to the platform a predetermined amount to direct electromagnetic radiation toward a predetermined detector, the active actuator includes a spur drive gear, a motor configured to drive the spur drive gear, a spur driven gear coupled to the bearing of the mirror mount and configured to be driven by the spur drive gear, and several adjustable stops each configured to position the mirror mount and the mirror in a predetermined position.

2. The optical path switching device of claim 1, wherein the active actuator is configured to rotate the mirror mount and the mirror to direct the reflected electromagnetic radiation to one of five detectors.

3. The optical path switching device of claim 2, wherein the five detectors include a visible (VIS) camera, a near infrared (NIR) camera, a short-wave infrared (SWIR) camera, a first test camera, and a second test camera.

4. The optical path switching device of claim 1, wherein a controller is coupled to the active actuator, the controller being configured to manipulate the rotation of the mirror mount and the mirror to direct the reflected electromagnetic radiation to the predetermined detector.

5. The optical path switching device of claim 1, further comprising a passive actuator configured to adjust an angle of the mirror with respect to the mirror mount.

6. The optical path switching device of claim 5, wherein the passive actuator includes a bracket secured to the mirror base, the bracket having a rack gear portion.

7. The optical path switching device of claim 6, wherein the rack gear portion is configured to engage a pinion gear provided on a mirror shaft of the mirror, with the rack gear portion serving as a cam follower and the pinion gear serving as a mirror driver.

8. The optical path switching device of claim 5, wherein the passive actuator maintains the mirror preloaded against an adjustable stop using a spring.

9. A method of directing electromagnetic radiation from a mirror to a detector of a plurality of detectors, the method comprises:
   directing electromagnetic radiation to a mirror supported by a mirror mount coupled to a platform;
   rotating the mirror to change a direction of electromagnetic radiation directed by the mirror to direct electromagnetic radiation toward a predetermined detector; and
   stopping the rotation of the mirror by one stop of several adjustable stops each configured to position the mirror mount and the mirror in a predetermined position.

10. The method of claim 9, wherein an active actuator is configured to rotate the mirror mount with respect to the platform a predetermined amount to direct electromagnetic radiation toward the predetermined detector.

11. The method of claim 10, wherein the active actuator includes a spur drive gear, a motor configured to drive the spur drive gear, and a spur driven gear coupled to the bearing of the mirror mount and configured to be driven by the spur drive gear.

12. The method of claim 11, wherein the active actuator is configured to rotate the mirror mount and the mirror to direct the reflected electromagnetic radiation to one of five detectors.

13. The method of claim 9, further comprising adjusting an angle of the mirror with respect to the mirror mount.

14. The method of claim 13, wherein a passive actuator is configured to adjust an angle of the mirror with respect to the mirror mount.

15. The method of claim 14, wherein the passive actuator includes a bracket secured to the mirror base, the bracket having a rack gear portion.

16. The method of claim 15, wherein the rack gear portion is configured to engage a pinion gear provided on a mirror shaft of the mirror, with the rack gear portion serving as a cam and the pinion gear serving as a mirror driver.

* * * * *